United States Patent [19]

Amoretti

[11] Patent Number: 5,722,698
[45] Date of Patent: Mar. 3, 1998

[54] EXTENSION COUPLING FOR DISTRIBUTION DEVICES FOR GASEOUS FLUIDS AND/OR LIQUIDS

[75] Inventor: Luigi Amoretti, Romano d'Ezzelino, Italy

[73] Assignee: T.P.A. Impex S.p.A., Romano d'Ezzelino, Italy

[21] Appl. No.: 446,970

[22] Filed: May 23, 1995

[30] Foreign Application Priority Data

May 27, 1994 [IT] Italy ................... PD94A0100

[51] Int. Cl.⁶ .................................. F16L 25/06
[52] U.S. Cl. .................. 285/123.15; 285/7; 285/317; 285/423; 285/921
[58] Field of Search .................. 285/133.1, 138, 285/317, 423, 921, 7, 308, 55, 47, 123.1, 123.15

[56] References Cited

U.S. PATENT DOCUMENTS

| | | | |
|---|---|---|---|
| 2,582,446 | 1/1952 | Martinet | 285/317 X |
| 2,755,107 | 7/1956 | Dow | 285/317 X |
| 3,713,076 | 1/1973 | Gabrielian et al. | 285/317 X |
| 4,022,205 | 5/1977 | Tenczar | 285/3 X |
| 4,083,077 | 4/1978 | Knight et al. | |
| 4,133,312 | 1/1979 | Burd | 285/423 X |
| 4,236,953 | 12/1980 | Takahashi | |
| 5,413,386 | 5/1995 | Dal Palu | 285/921 X |

FOREIGN PATENT DOCUMENTS

| | | | |
|---|---|---|---|
| 2163465 | 2/1986 | United Kingdom | |
| 9102919 | 3/1991 | WIPO | 285/921 |

*Primary Examiner*—Terry Lee Melius
*Assistant Examiner*—Heather Shackelford
*Attorney, Agent, or Firm*—Guido Modiano; Albert Josif

[57] ABSTRACT

The extension coupling for fluid distribution equipment has a first external tubular body, a second internal tubular body for the passage of said fluids, and a coupling for its connection, in series, to other similar elements and/or handle connected to the distribution equipment and/or accessories. The first body and the second body are monolithic, and are obtained from one single molding process of plastic material.

5 Claims, 2 Drawing Sheets

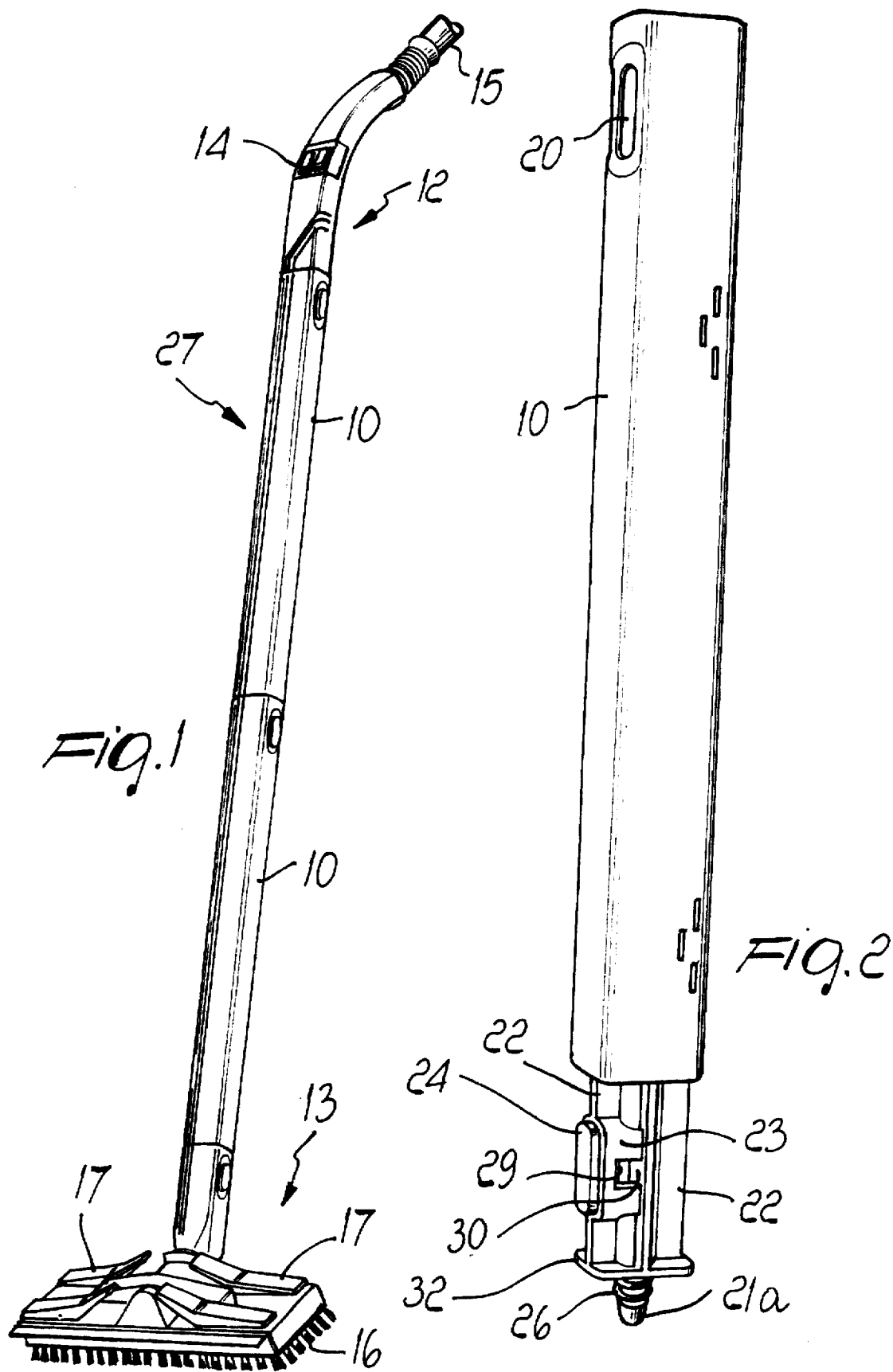

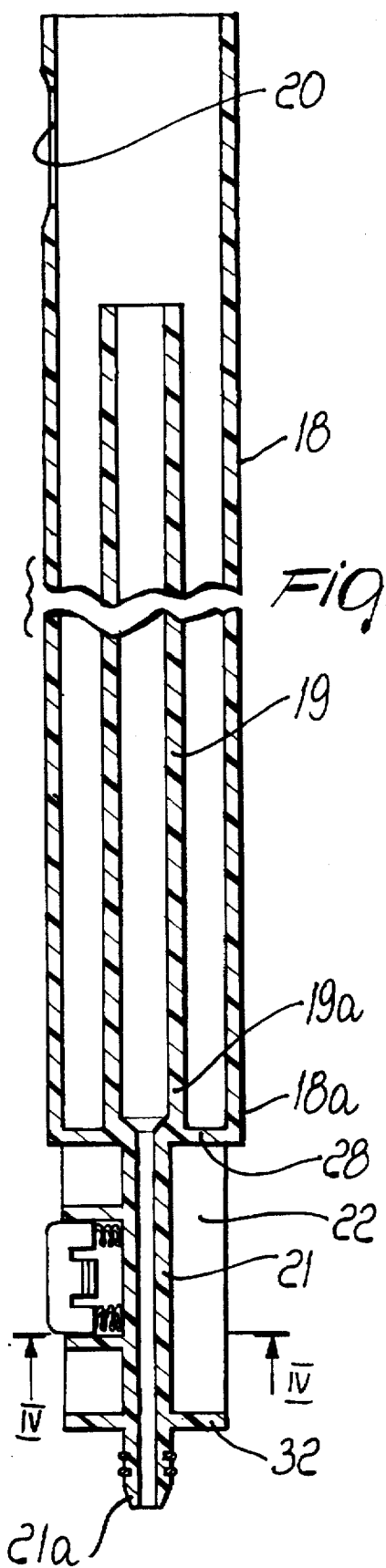
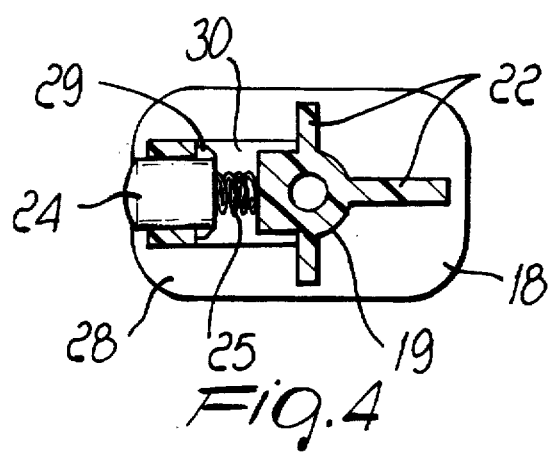
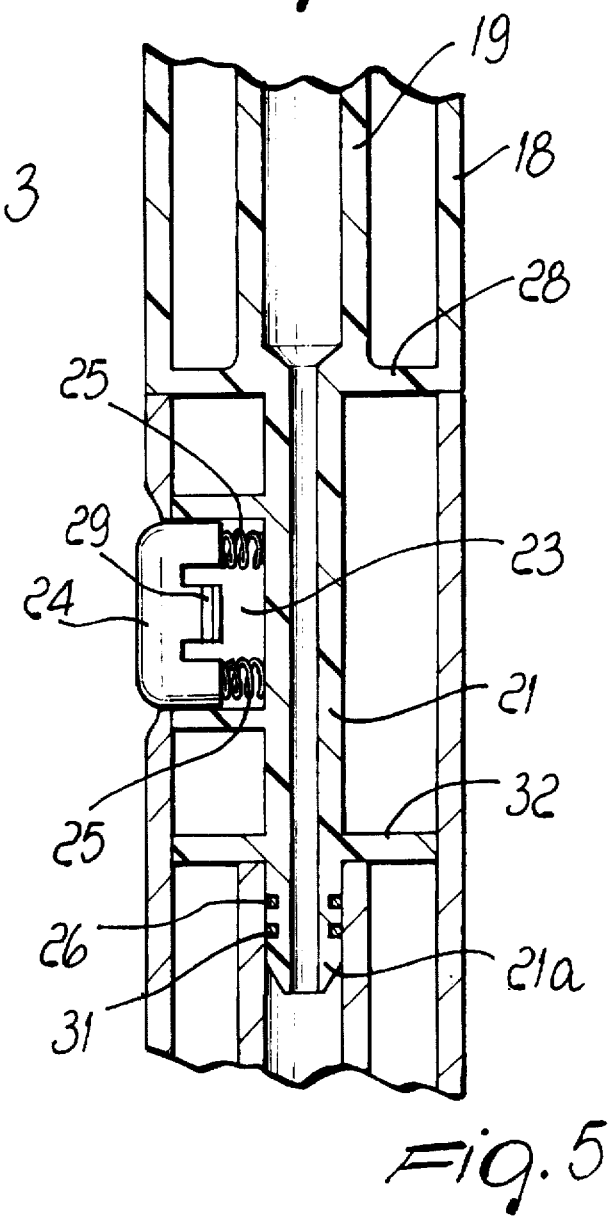

EXTENSION COUPLING FOR DISTRIBUTION DEVICES FOR GASEOUS FLUIDS AND/OR LIQUIDS

BACKGROUND OF THE INVENTION

The invention refers to the structural elements of an extension coupling used for distribution equipment of gaseous fluids and/or liquids.

The use of vapour under pressure (2 or 3 atmospheres) and at a temperature of approximately 130° centigrade, as a detergent fluid and a partial disinfectant is well established in the electrodomestic house cleaning appliance and industrial cleaning equipment field.

Nowadays, various apparatus exist for the distribution of vapour in the above mentioned conditions. Such equipment is substantially made up from a portable machine body with a heating unit connected by means of a tube to a rigid extension acting as a support and as handle grip for the movement of devices for the distribution of the vapour.

The main problem regarding the rigid extension relates to the fact that the vapour within it flows at an elevated temperature and therefore, the proposed ducting passage of the heated vapour must necessarily be isolated from the external surface which is held by the user, who could otherwise be burned.

Known extensions are composed by an external tubular body which can be hand-held by the user and an internal tubular body within which heated vapour passes under pressure.

Furthermore, the rigid extension of the mentioned known art is further subdivided in sections (usually two) reciprocally connected by means of couplings.

It is to be evidenced that in the known extensions the internal tubular body is made of a metallic tube, while the external tubular body is made of plastic material.

Furthermore, the internal tubular body is maintained at a distance from the external tubular body by means of end separator sleeves, fixed thereto by means of plugs, with the interposition of seals.

The seals are arranged in machined housings made by lathe on the internal tubular body.

It is evident from the foregoing that considerable constructive complexity is involved with the known rigid extensions for fluid and/or liquid distribution equipment which require a high number of parts and often complex operations.

It is also evident that to this high level of constructional complexity must be added unsatisfactory economic times and costs of production.

SUMMARY OF THE INVENTION

A main aim of the present invention is to provide an extension element, characterized in that it has constructional simplicity and a minimum amount of elements to be employed for its manufacture.

Moreover, an aim of the present invention is to provide an extension element according to the invention, which reduces the diversity of materials employed to produce it.

Another aim of the present invention is to provide an extension element that can be made from known technology and which can achieve a significant savings of time and costs of production.

Another aim of the invention is to provide an extension element that is absolutely safe and free from vapour losses and from the danger of causing burns to the user.

With these and other aims in view, the invention provides a structural extension coupling element for distribution equipment of gaseous fluids and/or liquids, comprising a first external tubular body, a second internal tubular body for the passage of said fluids, and coupling devices for the connection of an extension element in series with other similar elements and/or a handle connected to the distribution equipment and/or accessories, characterized in that said first body and said second body are monolithic, being obtained by a single molding process employing plastic material.

BRIEF DESCRIPTION OF THE DRAWINGS

Further characteristics and advantages of the invention will become apparent from the detailed description, illustrated only by way of non limitative example in the accompanying drawings, wherein:

FIG. 1 is a perspective view of the structure of the extension coupling element according to the invention;

FIG. 2 is a perspective view of a detail of an extension coupling element according to the invention;

FIG. 3 is a view according to a plane passing through the longitudinal axis of the detail illustrated in FIG. 2;

FIG. 4 is a view taken along the sectional plane IV—IV of the detail illustrated in FIG. 2;

FIG. 5 is a sectional view that illustrates the coupled joining of two elements of an extension according to the invention.

DESCRIPTION OF THE PREFERRED EMBODIMENTS

With reference to the above figures, the reference numeral 27 indicates the group composed of two extention elements 10, of a handle 12 and of a distribution accessory 13 (all described hereinafter and coupled reciprocally).

The handle 12 houses control push-buttons 14 and its upper part is connected to an inlet tube 15 coming from a heating unit of a distribution device for gaseous fluids and/or liquids (not illustrated in the figures).

The distribution accessory 13, instead, is provided with a band of brushes 16 and springs 17 for the blockage of wipers or similar.

Each of the extension elements 10, has a structure substantially comprising a first external tubular body 18 monolithic with a second internal tubular body 19.

The tubular bodies 18 and 19 are substantially coaxial and formed monolithic to at the respective extremities 18a and 19a with a transverse plate 28.

The first external tubular body 18 has a transverse section substantially rectangular with rounded corners.

At an end portion of the first external tubular body 18, opposite to the extremity 18a, on one of the two surfaces relative to the minor sides of the above cited transverse section that, in an operative position, becomes a surface substantially lateral with respect to the front of the distribution accessory 13, a full depth drilled hole 20 is obtained.

The second internal tubular body 19 has a shorter length with respect to the first external tubular body 18, in order to create an internal gap in the end corresponding to the full depth drilled hole 20.

This empty space constitutes the female part for joining to the coupling.

Monolithic to the transverse plate 28, coaxial and communicating with the second internal tubular body 19, is a male tube 21 constituting the corresponding joining element to the coupling.

Four longitudinal ribbed portions 22 extend from the male part 21 in order to maintain separation and structural strength.

These portions are arranged in a crossed manner and have one extremity which is monolithic to the transverse plate 28 while the opposite extremity is monolithic to the transverse plate 32.

In a central zone of the ribbed portion 22 positioned on the side corresponding to the hole 20, a seat 23 is formed for a push-button 24 and two underlying springs 25.

The springs 25 are arranged between the push-button 24 and the base of the seat 23.

The push-button 24 has a shape complementary to the hole 20 and has on both sides two end-stop projections 29 sliding on corresponding guides 30 machined in the walls of the seat 23.

Furthermore, zones of the push-button 24 upper border, in proximity to the direction of the insertion of the elements 10 (substantially the longitudinal direction), are convex to render the coupling operation between the elements 10 or between one element 10 and the handle 12 or the distribution accessory 13, almost automatic.

With the coupling operation, it is the border of the element 10 which forces the push-button 24 into its seat.

The male part 21 ends with an extremity 21a which is substantially frustum-shaped and is provided in a zone adjacent to it, with annular slots 31 parallel to each other, adapted to accomodate ring seals 26.

Furthermore, the same male part 21 has an internal tube, the diameter whereof is smaller with respect to the diameter of the internal tube of the second internal tubular body 19, to which it is connected.

In practice, the functioning of the extension coupling is as follows: the element 10 couples with the male 21 in the hollow portion of the internal volume (female) of the first external tubular body 18 of another equal element 10.

Furthermore, the push-button 24 which, in the depressed mode, is concealed due to the action of the springs, once the depression is completed, couples in hole 20 of element 11.

The uncoupling occurs by exerting pressure on push-button 24 and applying simultaneously traction in a longitudinal sense between the coupled elements 11.

It has practically been demonstrated that the proposed aims have been achieved with the present invention.

The extreme simplicity of assembly of the extension, especially with regard to the coupling between its component elements, is now clear.

Furthermore, concerning the component elements of the extension structure, it is observed that almost all are monolithic to each other and therefore do not require further assembly in production or specific machining for achieving savings of time and costs of production.

Furthermore, it is to be noted, that by having positioned the push-buttons on one of the lateral surfaces of the extension, relatively to the frontal portion of the distribution accessory in an operative position, a high ergonomic assembly is achieved, which facilitates disassembly operations and change of order of the extension.

The invention, conceived as such, is susceptible to modifications and variations all within the concept of the invention.

In practice the materials employed as well as the dimensions which constitute the individual components of the device may naturally be any according to the specific requirements.

What is claimed is:

1. A structural element of an extension for distribution equipment of fluids in which the distribution equipment comprises a heating unit for heating the fluids, the extension being adapted for transporting the heated fluids and for being held by an operator at an external surface thereof, the structural element of the extension comprising:

a first external tubular body and a second internal tubular body for the passage of said fluids, wherein said second internal tubular body is disposed inside said first external tubular body and wherein the first body and said second body are a monolithic single molded plastic material portion of the structural element; and a connecting structure for coupling the structural element to an other said structural element in a manner such that a ducting passage for the heated fluids is formed which passes through said second internal tubular body of said structural element and through an other said second internal tubular body of said other said structural element and which is isolated from said external surface of said extension whereby to decrease danger of causing burns to the operator;

and wherein said connecting structure is located at mutually opposite extremities of said structural element;

and wherein said connecting structure comprises at a first extremity of the structural element a male tube which is coaxial and connected to said second internal body;

and wherein the connecting structure further comprises, at a second extremity of the structural element arranged opposite said first extremity, a female portion defined by a gap between the first external tubular body and the second internal tubular body and shaped for connectably receiving an other said male tube of said other said structural element.

2. The structural element according to claim 1, wherein said connecting structure further comprises at said first extremity longitudinal ribbed portions extending radially outwardly from said male tube.

3. A structural element of an extension for distribution equipment of fluids in which the distribution equipment comprises a heating unit for heating the fluids, the extension being adapted for transporting the heated fluids and for being held by an operator at an external surface thereof, the structural element of the extension comprising:

a first external tubular body and a second internal tubular body for the passage of said fluids, wherein said second internal tubular body is disposed inside said first external tubular body and wherein the first body and said second body are a monolithic single molded plastic material portion of the structural element; and a connecting structure for coupling the structural element to one or more of: another similar structural element; a handle for connection to said heating unit; and a fluid distribution accessory; in a manner such that a ducting passage for the heated fluids is formed which passes through said second internal tubular body of said structural element and which is isolated from said external surface of said extension whereby to decrease danger of causing burns to the operator;

wherein said connecting structure comprises at a first extremity of the structural element a male tube which is coaxial and connected to said second internal body, and longitudinal ribbed portions extending radially outwardly from said male tube, and wherein the connecting structure further comprises, at a second extremity of the structural element arranged opposite said first extremity, a female portion defined by a gap between the first external tubular body and the second internal tubular body; and wherein said connecting structure further comprises an elastically biased push-button radially movably arranged in a seat provided at said first extremity, and a full depth drilled hole passing through said first external tubular body at said gap at the second extremity.

4. The structural element according to claim 3, wherein said male tube has an end having substantially a frustum-shaped support provided with sealing means.

5. The structural element according to claim 4 wherein said sealing means are constituted by annular elastomer seals.

* * * * *